(12) United States Patent
Liang

(10) Patent No.: US 9,181,489 B2
(45) Date of Patent: Nov. 10, 2015

(54) METHOD AND APPARATUS FOR TORREFACTION OF BIOMASS MATERIALS

(71) Applicant: David Tee Liang, Singapore (SG)

(72) Inventor: David Tee Liang, Singapore (SG)

(73) Assignee: CARBONEXCEL PTE LTD, Singapore (SG)

( * ) Notice: Subject to any disclaimer, the term of this patent is extended or adjusted under 35 U.S.C. 154(b) by 0 days.

(21) Appl. No.: 14/370,961

(22) PCT Filed: Jan. 4, 2013

(86) PCT No.: PCT/SG2013/000004
§ 371 (c)(1),
(2) Date: Jul. 7, 2014

(87) PCT Pub. No.: WO2013/103321
PCT Pub. Date: Jul. 11, 2013

(65) Prior Publication Data
US 2015/0053542 A1    Feb. 26, 2015

(30) Foreign Application Priority Data

Jan. 6, 2012  (SG) .................................. 201200141

(51) Int. Cl.
*C10B 47/30* (2006.01)
*C10B 53/02* (2006.01)
*F27B 7/34* (2006.01)
(Continued)

(52) U.S. Cl.
CPC .................. *C10B 47/30* (2013.01); *B02C 17/20* (2013.01); *C10B 49/16* (2013.01); *C10B 53/02* (2013.01);
(Continued)

(58) Field of Classification Search
CPC ........ C10B 47/30; C10B 49/16; C10B 53/02; C10L 5/28; C10L 9/083; B02C 15/08; B02C 15/10

USPC .......... 201/7, 20, 33; 202/100, 108, 131, 239, 202/265
See application file for complete search history.

(56) References Cited

U.S. PATENT DOCUMENTS 2,984,602 A * 5/1961 Nevens et al. .................... 201/7
3,442,789 A * 5/1969 Zimmerman, Jr. ............ 208/411
(Continued)

OTHER PUBLICATIONS

International Search Report for PCT/SG2013/000004 mailed on Mar. 26, 2013.
International Preliminary Report on Patentability for PCT/SG2013/000004 dated Dec. 3, 2013.
ISR for related PCT/SG2013/000004 mailed on Mar. 26, 2013.
IPRP for related PCT/SG2013/000004 completed on Dec. 3, 2013.
WO/ISA for related PCT/SG2013/000004 mailed on Mar. 26, 2013.

*Primary Examiner* — In Suk Bullock
*Assistant Examiner* — Jonathan Miller
(74) *Attorney, Agent, or Firm* — Ladas & Parry, LLP

(57) ABSTRACT

Exemplary techniques disclosed provide a heat transfer element adapted for use in a rotary furnace for torrefaction and particle size reduction of biomass material. The heat transfer element is made up of a rounded object having a specific gravity substantially higher than a specific gravity of the biomass material to be torrefied, a heat capacity sufficient for the heat transfer elements in the rotary furnace to heat the biomass material to be torrefied, and a hardness sufficient for the heat transfer element to serve as grinding media to reduce the particle size of the biomass material to be torrefied. The heat transfer element has one or more surface features preformed in a surface of the rounded object. The surface features are configured to increase traction between the heat transfer elements and the biomass material to be torrefied. A system for torrefaction and particle size reduction of biomass material, including a rotary furnace charged with heat transfer elements as described above, and a method for using such a system for torrefaction and particle size reduction of biomass material are also discussed.

20 Claims, 2 Drawing Sheets

(51) Int. Cl.
*C10L 9/08* (2006.01)
*B02C 17/20* (2006.01)
*F27B 7/16* (2006.01)
*F27B 7/20* (2006.01)
*C10B 49/16* (2006.01)
*C10B 1/10* (2006.01)

(52) U.S. Cl.
CPC ............. *C10L 9/083* (2013.01); *F27B 7/161* (2013.01); *F27B 7/20* (2013.01); *F27B 7/34* (2013.01); *C10B 1/10* (2013.01); *C10L 2290/06* (2013.01); *C10L 2290/28* (2013.01); *C10L 2290/546* (2013.01); *Y02E 50/14* (2013.01); *Y02E 50/15* (2013.01); *Y02E 50/30* (2013.01)

(56) References Cited

U.S. PATENT DOCUMENTS

| | | | | |
|---|---|---|---|---|
| 4,152,245 | A * | 5/1979 | Abdul-Rahman et al. | 208/409 |
| 4,214,113 | A * | 7/1980 | Khmelevskaya et al. | 585/634 |
| 4,421,629 | A * | 12/1983 | York et al. | 208/410 |
| 4,473,461 | A * | 9/1984 | Thacker et al. | 208/425 |
| 4,512,873 | A * | 4/1985 | Escher et al. | 208/128 |
| 6,203,765 | B1 * | 3/2001 | Taciuk et al. | 422/210 |
| 6,589,417 | B2 * | 7/2003 | Taciuk et al. | 208/179 |
| 8,821,692 | B2 * | 9/2014 | Henrich et al. | 201/12 |
| 2009/0218209 | A1 | 9/2009 | Poulleau | |
| 2011/0278149 | A1 | 11/2011 | Hornung | |

* cited by examiner

METHOD AND APPARATUS FOR TORREFACTION OF BIOMASS MATERIALS

CROSS-REFERENCE TO RELATED APPLICATIONS

This application is the U.S. National Stage of International Patent Application No. PCT/SG2013/000004, filed on Jan. 4, 2013, which claims priority to Singaporean Patent Application No. 201200141-8, filed on Jan. 6, 2012, the disclosures of which are hereby incorporated by reference in their entireties.

FIELD OF THE INVENTION

Embodiments of the invention relate to the field of torrefaction of biomass materials, and in particular to a rotary furnace and heat transfer media for use in a torrefaction process, and to a torrefaction method using such a rotary furnace and heat transfer media.

BACKGROUND OF THE INVENTION

Biomass-based fuels are considered carbon neutral and are generally regarded as a renewable energy source. With the abundant availability of biomass waste materials globally, converting such materials into a fuel in form of raw pellets, pyrolysis oil (bio oil), cellulosic ethanol, biogas or gasification products has been the subject of intensive research. These processes are intended to increase the energy density of the biomass waste material so that they can be transported economically to markets and readily used by conventional combustion based power generation technologies.

Torrefaction describes a process in which biomass materials are heated to between 200°-320° C. in absence of oxygen, to completely drive out the moisture within the biomass materials, as well as some low-boiling-point volatiles, so that the biomass material is amenable to further compression into high energy density pellets. Torrefied biomass pellets have the added advantage of being slightly hydrophobic, so they do not absorb water that can cause swelling and disintegration or subsequent biodegradation through the attack by microbes and fungi. Thus, torrefied biomass fuel is stable enough to be shipped across long distances and to be stored in silos for long period of time. These are important considerations for a commodity solid fuel.

Additionally, use of torrefied biomass pellets allows the possibility of co-firing in coal based utility power stations with minimum retrofit, while significantly reducing the carbon footprint of the power station. Since coal fired power stations often have the highest carbon emission profiles of all power generation technologies, the operators of such stations have been requested by various governments to take measures to reduce their carbon emissions. For example, the European Union has proposed up to 25% co-firing of biomass pellets to achieve meaningful carbon emission reduction targets without compromising the operations of the utilities.

Numerous methods have been proposed for meeting the heating requirements for torrefaction of biomass materials. For example, use of fluidised beds, moving beds, screw reactors, and shaft furnaces have been proposed for use in torrefaction. However, since one of the major considerations is to keep the torrefaction reactor oxygen-free, such methods may face significant challenges, since they all need gas as the fluidising medium and/or as the convective heat transfer medium. Air would generally not be used as such a medium for the torrefaction process, since it contains approximately 21% oxygen, and torrefaction should be carried out in a substantially oxygen-free environment. The cost of using substitutes for air as the fluidising medium and/or convective heat transfer medium could be prohibitive. Other proposals involve use of rotary furnaces for torrefaction of biomass materials.

Of course, in addition to the "usual" challenge of maintaining low- or no-oxygen conditions during torrefaction, a relatively constant operating temperature should be maintained. It can be difficult to achieve and maintain such a constant operating temperature if hot gas or a fuel-based heating system is used. Additionally, previously proposed torrefaction methods may face difficulties with generally poor heat transfer to loosely-packed biomass material, which may slow the heating process and make it less efficient. Due to economic considerations, it is generally desirable to keep the process time to less than 30 minutes.

Further, it would be desirable to control the particle size of the biomass material, in order to provide particles that are suitable for formation into pellets during a subsequent pellet making process. Current torrefaction processes are generally designed only to "heat" the biomass material to a desired temperature. Subsequent particle size reduction may be necessary in order to provide particles that are suitable for the production of pellets.

SUMMARY OF THE INVENTION

In accordance with embodiments of the invention, apparatus and methods are provided to achieve torrefaction of biomass materials. In some arrangements, substantially uniform heating is applied, and reasonably precise temperature control of the biomass materials may also be applied. This may be carried out in a substantially oxygen-free atmosphere. Additionally, embodiments in accordance with the invention may also provide high heat transfer and energy efficiency, as well as enhanced mixing of the biomass materials. Additionally, heat transfer may be combined with particle size reduction, to provide torrified particles that are suitable for pellet production. The torrefaction process may achieve energy densification of biomass waste materials of 15 $GJ/m^3$ or higher.

This is achieved in accordance with embodiments of the present invention by providing a heat transfer element adapted for use in a rotary furnace (100) for torrefaction and particle size reduction of biomass material. The heat transfer element is made up of a rounded object having a specific gravity significantly higher than a specific gravity of the biomass material to be torrefied (generally by a factor of at least approximately five), a heat capacity sufficient for the heat transfer elements in the rotary furnace to heat the biomass material to be torrefied, and a hardness sufficient for the heat transfer element to serve as grinding media to reduce the particle size of the biomass material to be torrefied. The heat transfer element has one or more surface features formed in a surface of the rounded object. The surface features are configured to increase traction between the heat transfer elements and the biomass material to be torrefied. The surface features may also be provided to increase the surface area of the elements, which will enhance heat transfer.

In some embodiments, the heat transfer elements have a heat capacity such that a total mass of the heat transfer elements of approximately 8-10 times the total mass of the biomass material to be torrefied is sufficient to quickly and evenly heat the biomass material.

In some embodiments, the surface features of the heat transfer element include a cut, which may have an angle between inner edges of the cut between approximately 30° and approximately 45°. In some embodiments, there may be one or more branch cuts that branch off of the cut. It will be understood that as used herein, a "cut" may be formed by cutting, molding, or by any other means of forming a section of the heat transfer element having edges configured to increase traction between the heat transfer elements and the biomass to be torrefied.

In accordance with various embodiments of the invention, the heat transfer element may be shaped as a sphere, a cylinder, or a spheroid, and may include steel, stainless steel, bronze, or a ceramic material.

In some embodiments of the invention, a system for torrefaction and size reduction of biomass material is provided. The system includes a rotary furnace, including a furnace tube having a tube entry and a tube exit. The furnace tube is surrounded by one or more heaters. The rotary furnace is substantially air-tight. The system also includes numerous heat transfer elements, as described above, disposed within the furnace tube.

In some embodiments, the heaters include clamshell electrical resistance heaters configured to radiate heat towards the center of the furnace tube. In other embodiments, the heaters include a thermal fluid heating system, such as a thermal oil system. The heaters are controlled by a controller that is configured to maintain the rotary furnace at a predetermined temperature between approximately 200° C. and 320° C. with a precision of approximately +/−2° C. during the torrefaction process.

In some embodiments, an inner wall of the furnace tube includes low-rise spiral baffles, configured to facilitate forward movement of the biomass material in the furnace tube when the furnace tube is rotated. The rotary furnace may further include a coarse screen disposed near the tube exit. The coarse screen is configured to allow torrefied biomass material to pass through the coarse screen and exit the rotary furnace, while retaining the heat transfer elements within the furnace tube.

In some embodiments, the invention provides a method for torrefaction and particle size reduction of biomass material—The method includes introducing the biomass material into a rotary furnace that is charged with numerous heat transfer elements—The heat transfer elements are made up of rounded objects having a specific gravity substantially higher than a specific gravity of the biomass material (generally by a factor of at least approximately five), a heat capacity sufficient for the heat transfer elements to heat the biomass material, and a hardness sufficient for the heat transfer elements to serve as grinding media to reduce the particle size of the biomass material. The heat transfer elements further include surface features configured to increase traction between the heat transfer elements and the biomass material.

The method further includes rotating the rotary furnace at a pre-defined rate to provide contact between the heat transfer elements and biomass material. This may be used to heat the biomass material evenly (or at least relatively evenly) and to use the heat transfer elements to grind the biomass material to reduce a particle size of the biomass material. This can be done while maintaining a predetermined temperature and a low- or no-oxygen condition in the rotary furnace. The torrefied biomass material with a reduced particle size is discharged from the rotary furnace after a predetermined operating time.

Maintaining a predetermined temperature in the rotary furnace may include maintaining a predetermined temperature in a range between approximately 200° C. and approximately 320° C., with a precision of +/− approximately 2° C. Maintaining a low- or no-oxygen condition in the rotary furnace may include introducing an inert gas into the rotary furnace.

In some embodiments, the method may further include pre-heating the rotary furnace and the heat transfer elements within the rotary furnace to the predetermined temperature. Some embodiments may include pre-drying the biomass material using a waste heat source prior to introducing the biomass material into the rotary furnace. In some embodiments, the torrefied biomass material is quenched (i.e., rapidly cooled) after it is discharged from the rotary furnace, to prevent further oxidation of the torrefied biomass material.

In some embodiments of the method, the surface features of the heat transfer elements include a cut. One or more branch cuts may branch off of the cut. In some embodiments of the method, the heat transfer elements are shaped as a sphere, a cylinder, or a spheroid.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
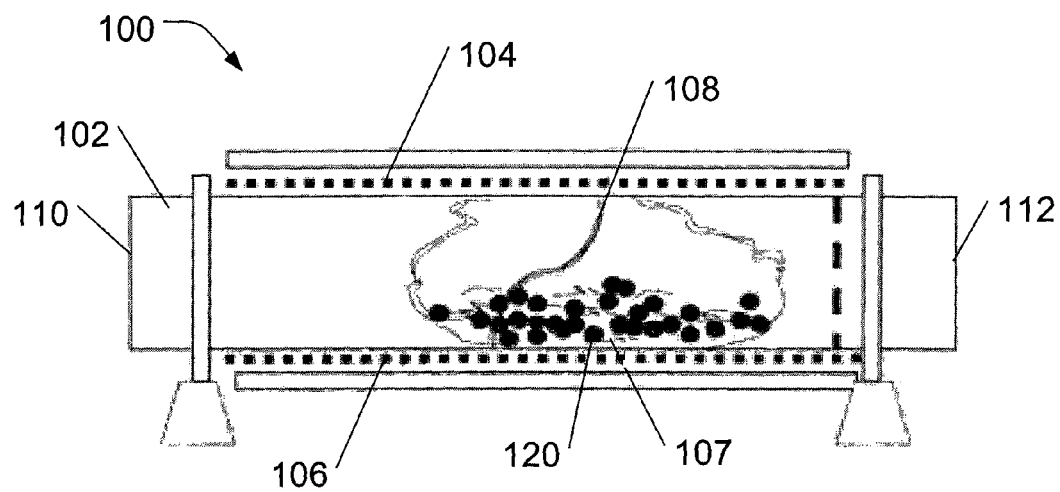
FIG. 1 shows a rotary furnace charged with heat transfer elements and fibrous biomass materials, in accordance with an embodiment of the invention.

In accordance with an example embodiment of the invention, a torrefaction system is provided that carries out torrefaction of biomass waste materials with the aim to achieve energy densification of 15 GJ/m$^3$ or higher in form of biomass pellets. An overview of the system is shown in FIG. 1, which shows a specially designed rotary furnace 100. The rotary furnace 100 includes a furnace tube 102, which may be constructed from high strength steel plates. The outside of the furnace tube 102 is fitted with multiple sections of clamshell electrical resistance heaters, such as heaters 104 and 106. Alternatively, the furnace tube 102 may be jacketed with thermal fluids or a thermal fluid heating system, such as a thermal oil system, or other suitable heating systems for the heating of the material inside of the furnace tube 102. A controller, such as standard programmable logic controller (PLC) (not shown) may be used to control the furnace temperature during use, preferably to maintain a predetermined temperature between 200° C. and 320° C., with a precision of approximately +/−2° C. In use, biomass materials 107 are fed into the furnace tube 102 at tube entry 110, and exit the furnace tube 102 after a predefined time period (typically no longer than approximately 30 minutes) as torrefied biomass having a particle size appropriate for the production of pellets at tube exit 112.

By using clamshell electrical resistance heaters, such as heaters 104 and 106, outside the wall of the furnace tube 102, all the heat will be radiated into the centre of the furnace tube 102, while the wall temperature of the furnace tube 102 will be monitored and maintained at the operating temperature. Typically, there will be a preheating period, where the furnace tube 102 is loaded with the heating media, such as the heat transfer elements 120 (described below). Once the operating temperature is achieved, biomass material will begin to be fed into the rotary furnace 100. Because the entire rotary furnace 100 (including the heat transfer elements 120) has a heat capacity many times greater than that of the biomass, the biomass will be quickly and uniformly heated, without the risk of over-temperature.

The inside wall of the furnace tube 102 includes low-rise spiral baffles 108, which facilitate the forward movement of the biomass material 107 in the furnace tube 102 upon rotation. The baffles 108 may be made of steel, and may be connected to the inside wall of the furnace tube 102, for example, by welding.

The furnace tube 102 is charged with a plurality of heat transfer elements 120. As will be described in greater detail below, these heat transfer elements 120 are generally rounded objects, such as spheres or cylinders, made of a material having a relatively high predetermined specific gravity (preferably much higher than the specific gravity of the biomass material), and a predetermined heat capacity and hardness, such as steel, stainless steel, bronze, or ceramic materials. For example, the heat transfer elements generally have a specific gravity that is at least approximately five times the specific gravity of the biomass material 107, and a heat capacity such that a total mass of heat transfer elements 120 of approximately 8-10 times the mass of the biomass material 107 charged in the rotary furnace is sufficient to quickly and evenly heat the biomass material. The specific gravity of the heat transfer elements may have other values, such as six, seven, eight, nine, 10, 12 or 15 (or higher) times the specific gravity of the biomass material.

During operation of the rotary furnace 100, the heat transfer elements 120 act as a heat sink, and are heated by the heaters 104 and 106 together with the biomass material. The furnace tube 102 is rotated at a predetermined rate, which allows intimate contact between the heat transfer elements 120 and biomass materials 107 that are being processed, heating the biomass materials evenly.

In addition to promoting even heat transfer to the biomass material 107, the heat transfer elements 120 also serve as grinding media during the torrefaction process, "crushing" or "milling" the biomass particles to smaller particle sizes. With the heat transfer elements 120, the rotary furnace 120 also acts as a kind of ball mill, that reduces the particle size of the biomass material 107. The total time over which the biomass is rotated in the rotary furnace with the heat transfer elements 120 will determine the final particle size of the biomass material 107. Additionally, as will be detailed below, the heat transfer elements 120 include surface features to increase traction between the heat transfer elements 120 and the biomass material 107, including cuts to allow easy release of the biomass material once torrefied. The heat transfer elements 120 generally have a uniform size, permitting them to be easily separated from the biomass.

The total charge of heat transfer elements to be used can be calculated based on the throughput of the biomass materials to be processed by in the rotary furnace 100. The following formula may be used to compute the total charge of heat transfer elements to be used:

$$m_{ht} \times Cp_{ht} \times \Delta T_{ht} = m_b \times Cp_b \times \Delta T_b$$

where
$m_{ht}$ is the mass of the heat transfer elements;
$m_b$ is the mass of the biomass being processed;
$Cp_{ht}$ is the heat capacity of the heat transfer elements;
$Cp_b$ is the heat capacity of the biomass being processed;
$\Delta T_{ht}$ is the temperature drop allowed for the heat transfer media; and
$\Delta T_b$ is the temperature rise in the biomass needed for torrefaction.

Generally, the intent is for the temperature drop of the heat transfer elements, $\Delta T_{ht}$, to be minimized in order to keep the torrefaction reactor (i.e., the rotary furnace 100) operating under close to isothermal conditions. Thus, the mass of the heat transfer elements and their heat capacity will generally be large in comparison to the mass and heat capacity of the biomass material that is being processed. As indicated above, the specific gravity of the heat transfer elements is generally at least approximately five times the specific gravity of the biomass material, and the total mass of the heat transfer elements will be about 8-10 times the mass of the biomass material being torrefied.

In order to achieve desired heat transfer characteristics for biomass torrefaction, in one implementation, the overall heating rate for the biomass material is kept at 50 C/min or less to prevent the onset of flash pyrolysis.

Conventional techniques implement the use of external electrical heaters to control the heating rate and temperature level. However, as herein disclosed, heat transfer media is added to enhance the transfer to the biomass material through intimate contact via heat conduction between the heat transfer elements and the biomass material trapped in between, and/or against the inner reactor wall. The heat transfer media is selected to have a high specific density and heat capacity so that the total sensible heat or thermal inertia, held by these elements are sufficiently high when compared with that of the biomass. This will result in a small temperature drop in the heat transfer elements upon contacting the biomass charge as to keep the entire reactor in an isothermal or nearly isothermal condition.

In one implementation, the total mass of the charged heat transfer media is 50 times (or more) that of the biomass material held up in the reactor at any given time. The heat transfer media may be preheated to the operating temperature prior to the biomass being charged. The heat capacity or specific heat of the heat transfer media is therefore an important property which will determine the operating characteristics of the reactor, however, no pre-set limits are placed on it, as long as the thermal inertia of these elements is sufficiently high that it will not lead to a local temperature drop more than 5 C.

Typical heat capacity or specific heats of the heat transfer material selected may be in the range of 0.45 to 1.5 KJ/Kg K. When compared with that of typical biomass materials that have a specific heat in the range of 1.5 to 2.0 KJ/Kg K, the mass charge of the heat transfer media may be many times (perhaps as much as 20-50 times) that of the biomass materials charged to the reactor. This will enable the reactor temperature to stay nearly constant near the set point, or the desired operating temperature with minimum fluctuations.

Near the tube exit 112, a coarse screen 114 allows the torrefied biomass to pass through the screen, to the tube exit 112, while retaining the heat transfer elements 120 within the furnace tube 102. The furnace tube 102 also includes gas injection nozzles (not shown) to allow the introduction of sufficient inert gas, such as nitrogen, to prevent runaway oxidation of the biomass material in the furnace. Otherwise, the rotary furnace 100 is designed to be air-tight, to prevent the introduction of ambient air into the system during operation.

The scale of the rotary furnace 100 depends on the volume of biomass material to be processed per hour. Using "distributed" biomass resources, a torrefaction unit capable of processing 10,000 to 15,000 T/year or 2-5 T/hour is envisioned. This capacity is intended to minimize the need for transportation of the raw biomass feedstock across long distances to a centralized processing facility. Based on this design parameter, a rotary furnace 100 with an internal volume of 10-20 cubic meters may be used. A furnace tube 102 with an internal diameter of about 1.5 to 2 meters, and that is approximately 8-10 meters in length would have a total internal volume of 20-25 cubic meters, which would be more than sufficient for this intended use.

Based on a design capacity of 2-5 T/hour, the heat transfer elements 120 may generally be spheres or cylinders having a diameter and/or length of approximately 50-75 mm. The spiral baffles 108 may generally have a height of approximately ¾ of the dimension of the heat transfer elements 120. The furnace tube 102 is made from high strength steel plates with sufficient thickness to withstand the mechanical load of the total weight of the tube itself plus that of the heat transfer elements 120 and the biomass material to be processed.

Figure 2A:
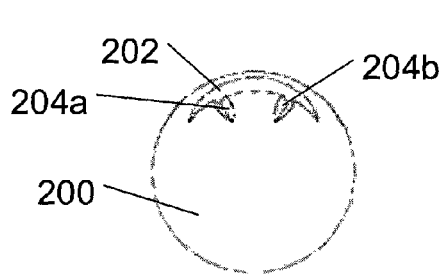
FIGS. 2A and 2B show views of an example spherical heat transfer element, in accordance with an embodiment of the invention.
Figure 2B:
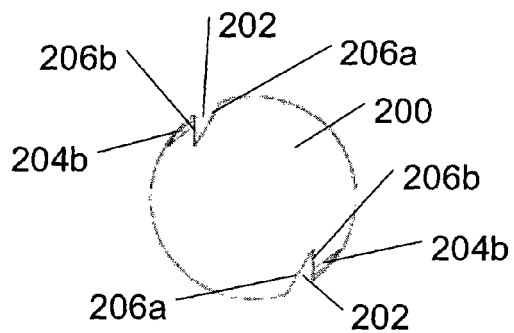

Referring now to FIGS. 2A-2B, an embodiment of a heat transfer element 120 in accordance with the invention is described. The heat transfer element 200 is spherical (or approximately spherical) in shape, and includes one or more cuts 202 in its surface. It will be understood that as used herein, a "cut" may be formed by cutting, molding, or by any other means of forming a section of the heat transfer element having edges configured to increase traction between the heat transfer elements and the biomass to be torrefied. Each of the cuts 202 may also have one or more branch cuts, such as branch cuts 204a and 204b. These cuts are configured to "hook" into fibrous elements of the biomass material. The cuts 202 are also configured to allow easy release of the biomass material once it has been torrefied. In some embodiments, one inner edge 206a of the cuts 202 may have an angle between 30° and 45° (these angles generally being approximate, allowing for the usual margin of error in measurements and manufacturing processes) to a "vertical" axis formed by the other inner edge 206b of the cuts 202. Many other surface modifications are also envisioned where the overall sphericity can be maintained while having features specifically designed to increase "traction" between the heat transfer element and biomass material.

The surface features on the heat transfer element 200, such as the cuts 202 and the branch cuts 204a and 204b are configured to increase "traction" between the heat transfer element 200 and biomass materials, to promote intimate mixing between biomass particles and/or fibres and heat transfer elements. This will prevent potential layering of the biomass material over the top of the heat transfer elements due to the lower specific gravity of the biomass material. Additionally, as noted above, the surface features such as cuts 202 and branch cuts 204a and 204b are configured at angles to allow easy release of the biomass material once torrefied.

The heat transfer element 200 should be made from a high density material, generally having a specific gravity of at least approximately five times that of the biomass material being treated, and good heat capacity as well as hardness, since, as described above, the heat transfer element 200 will also be used for grinding the biomass material. In some embodiments, a metal, such as steel, stainless steel, or bronze may be used to form the heat transfer element 200. Other materials, such as ceramics may also be used in some embodiments. By selecting heat transfer elements with high specific gravity, their action inside a rotary furnace is similar to that of the grinding media in a ball mill. The continuous "rolling" and "tumbling" motion will cause the biomass particles to be "crushed" and "milled" to smaller particle sizes.

As discussed above, for a design capacity of the overall system of 2-5 T/hour of biomass material, the heat transfer element 200 should have a diameter of approximately 50-75 mm. Of course, it will be understood that other diameters may be used, depending on the design capacity of the torrefaction system.

The heat transfer element 200 is shown as being approximately spherical. The overall "sphericity" or "roundness" of the heat transfer element 200 facilitates relatively unhindered movement inside the rotating furnace tube. This rounded form also provides the heat transfer element 200 with a large surface area, which will promote heat transfer. It will be understood that although the heat transfer element 200 is shown as being spherical, various other rounded forms could also be used, including spheroid, cylindrical, or other rounded forms that are able to rotate and move in a relatively unhindered fashion inside of the rotating furnace tube, and provide a large surface area for heat transfer.

Figure 3A:
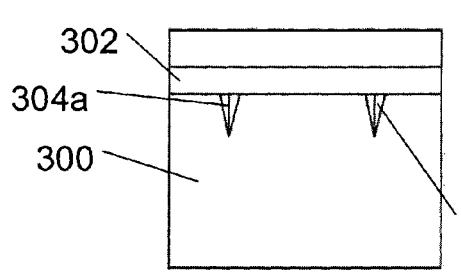
FIGS. 3A and 3B show views of an example cylindrical heat transfer element, in accordance with an embodiment of the invention.
Figure 3B:
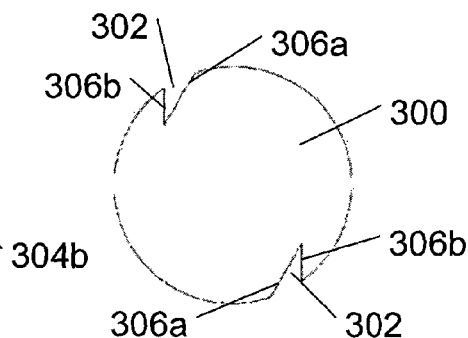

FIGS. 3A and 3B show an example heat transfer element 300 having a cylindrical form. Like the heat transfer element 200 shown in FIGS. 2A-2B, the heat transfer element 300 includes surface features in the form of cuts 302 and branch cuts 304a and 304b. As above, the cuts 302 include inner edges 306a and 306b. These surface features have a purpose similar to that described above with reference too FIGS. 2A-2B.

Figure 4:
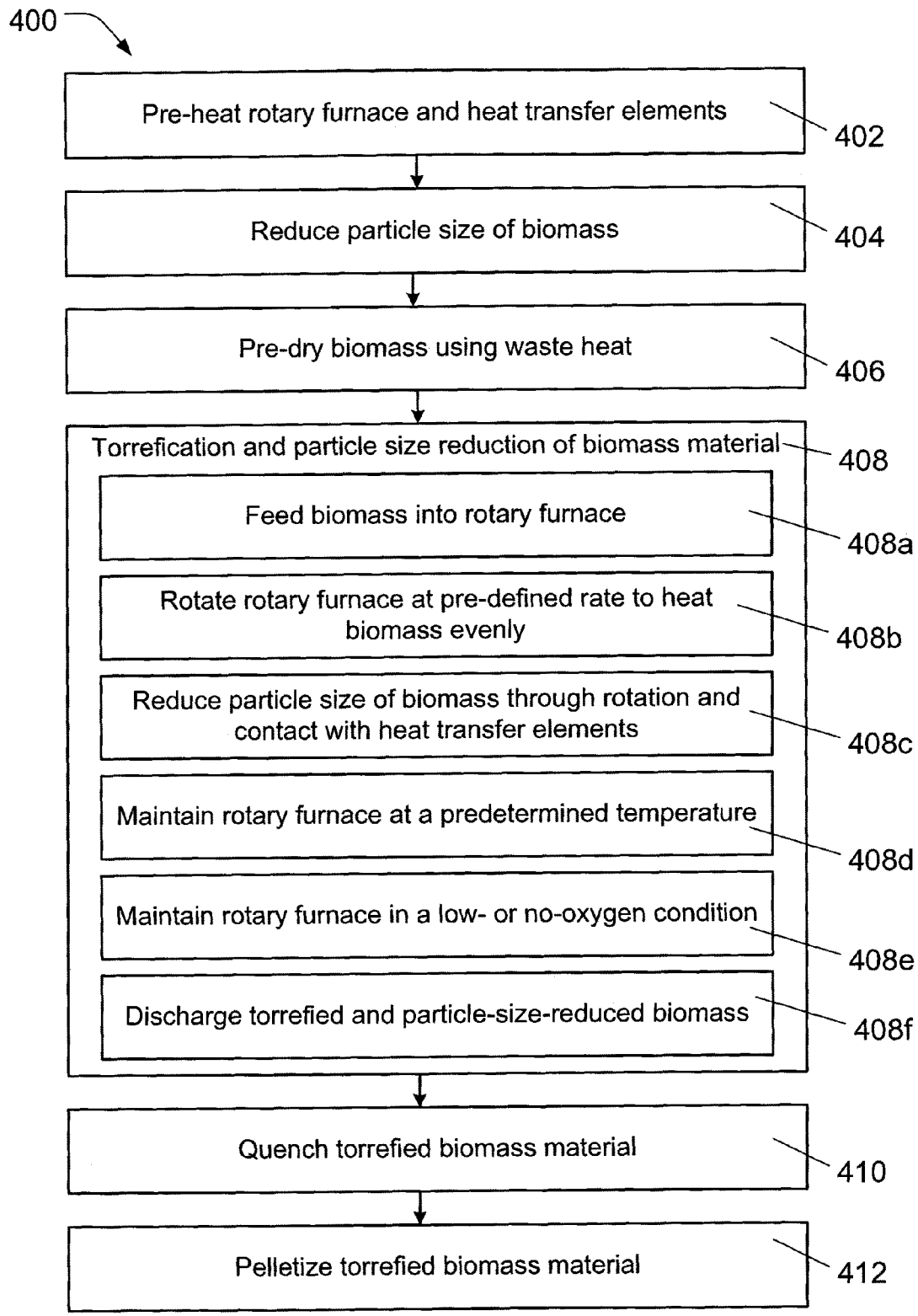
FIG. 4 is a block diagram showing a method for torrefaction of biomass material in accordance with an embodiment of the invention.

Referring now to FIG. 4, an overall method of torrefaction in accordance with embodiments of the invention is described. The method 400 starts with a step 402 of pre-heating the rotary furnace, together with the heat transfer elements that are loaded into the rotary furnace. The rotary furnace and heat transfer elements are pre-heated to the operating temperature of the torrefaction system (generally 200° C. to 320° C.) to provide for efficient continuous operation of the system. Pre-heating will ensure that when the biomass material is introduced, it will quickly attain operating temperature through the good mixing and intimate contact with the pre-heated heat transfer elements.

At step 404, the particle site of biomass waste materials are reduced to approximately ¼", or approximately 6 mm. This may be done, for example, by feeding the biomass materials through a known commercial wood chipper with vibrating sieves.

At 406, an optional step of pre-drying the biomass material is carried out, if, for example, there are waste heat sources available. These waste heat sources can be stack gas from boilers/furnaces or spent process steam. Generally, raw biomass waste may contain up to 60-70% moisture. By using pre-drying, this can be brought down to less than 20% prior to torrefaction, which may have several advantages. First, it will reduce the energy consumption for the torrefaction process, since a significant amount of energy may be spent in evaporating the moisture content of the biomass material. Second, it allows the evolved gas from the torrefaction process to be utilized in an energy recovery system, since the energy content is significantly elevated when the material is pre-dried. The evolved gas may be fed into existing boilers and/or diesel generators as auxiliary fuel thereby, reducing the overall process electrical energy consumption.

Once the biomass material has been chipped and optionally dried, the torrefaction system can be operated continuously with biomass material being fed via a belt feeder or helical screw feeder into the rotary furnace inlet. At step 408, torrefaction and simultaneous size reduction are carried out using the rotary furnace charged with heat transfer elements as described above. At sub-step 408a, biomass material is fed into the rotary furnace.

At sub-step 408b, the rotary furnace rotates at a pre-defined rate, providing contact between the heat transfer elements and biomass materials, to heat the biomass material evenly. As shown in sub-step 408c, the rotation and contact with the heat transfer elements simultaneously reduces the size of the biomass particles. As shown above, the heat transfer elements may be provided with surface features, such as cuts, configured to increase traction between the heat transfer elements and the biomass material, and to allow easy release of biomass material once the biomass material is torrefied.

In accordance with sub-step 408d, the heating is provided through the walls of the furnace either by electrical resistance heaters or other suitable heating mechanism such as thermal oil system to sustain a temperature range between 200° C. to 320° C., depending on the type of biomass material being fed and the degree of torrefaction desired. Temperature control to a precision of approximately ±2° C. is maintained to ensure that the rotary furnace operates substantially isothermally during the entire process.

At sub-step 408e, the interior of the rotary furnace is kept in a low- or no-oxygen condition, for example through introduction of inert gas, such as nitrogen, in order to prevent run-away oxidation of the biomass material in the furnace. It should be noted that introduction of inert gas may also occur during the pre-heating step 402. The rotary furnace is designed to be air-tight to prevent the introduction of ambient air into the system during the operations.

Once the desired operating time (generally approximately/hour) is achieved, at sub-step 408f, the biomass material can begin to be discharged continuously at the outlet of the rotary furnace. At the outlet of the rotary furnace, a course screen is used to separate torrefied biomass materials from the heat transfer media, and to keep the heat transfer media inside the furnace. It will be understood that the torrefaction process sub-steps 408a-408f may occur substantially simultaneously, as part of a continuous process. For example, baffles within the rotary furnace may move the biomass material forward through the rotary furnace continuously, so that as some torrefied and size-reduced biomass material is being processed in the furnace and is exiting the furnace, unprocessed biomass material is being introduced into the furnace.

At step 410, a conventional quenching system at the outlet of the furnace quenches (i.e., rapidly cools) the torrefied biomass to prevent further oxidation of the torrefied biomass. Once quenched, at step 412, the torrefied and size-reduced biomass material can be then fed into a conventional pelletizing machine, to be formed into high energy pellets. Finished biomass pellets are then ready to be stored in silos or bagged for shipping.

In accordance with embodiments of the invention, the use of the heat transfer elements in a rotary furnace combines improved heat transfer particle size reduction. Both are desired outcome for a torrefaction process. Additionally, by using an externally heated rotary furnace, relatively precise temperature control can be achieved, and heat loss through the walls of the rotary furnace can be kept low. The rotating action of the heat transfer media within the rotary furnace provides good mixing of the biomass material being treated, and uniform and even heating of the biomass without the risk of over-temperature. The surface features of the heat transfer elements enhance this mixing and heat transfer, and can further reduce the particle size of the biomass charge. Further, energy recovery is possible if pre-drying of the biomass material is carried, out, which may significantly improve overall process energy consumption.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A heat transfer element adapted for use in a rotary furnace for torrefaction and particle size reduction of biomass material, the heat transfer element comprising:
   a rounded object having a specific gravity at least 5 times a specific gravity of the biomass material to be torrefied, a heat capacity sufficient for a plurality of heat transfer elements to heat the biomass material to be torrefied, and a hardness sufficient for the heat transfer element to serve as grinding media to reduce the particle size of the biomass material to be torrefied, and
   one or more surface features pre-formed in a surface of the rounded object, the surface features configured to increase traction between the heat transfer elements and the biomass material to be torrefied.

2. The heat transfer element of claim 1, wherein the heat capacity of the heat transfer element is sufficient for a plurality of heat transfer elements having a total mass of approximately 8-10 times the mass of the biomass materials being charged in the rotary furnace to heat the biomass material to be torrefied.

3. The heat transfer element of claim 1, wherein the surface features of the heat transfer element comprise a cut.

4. The heat transfer element of claim 3, wherein the cut has an angle between inner edges of the cut between approximately 30° and approximately 45°.

5. The heat transfer element of claim 3, wherein one or more branch cuts branch off of the cut.

6. The heat transfer element of claim 1, wherein the heat transfer element is shaped as a sphere, a cylinder, or a spheroid.

7. The heat transfer element of claim 1, wherein the heat transfer element comprises steel, stainless steel, bronze, or a ceramic material.

8. A system for torrefaction and size reduction of biomass material, the system comprising:
   a rotary furnace comprising a furnace tube having a tube entry and a tube exit, the furnace tube being surrounded by one or more heaters, the rotary furnace being substantially air-tight; and
   a plurality of heat transfer elements according to claim 1 disposed within the furnace tube.

9. The system of claim 8, wherein the heaters comprise clamshell electrical resistance heaters configured to radiate heat towards the center of the furnace tube.

10. The system of claim 8, wherein the heaters comprise a thermal fluid heating system.

11. The system of claim 8, wherein the heaters are controlled by a controller that is configured to maintain the rotary furnace at a predetermined temperature between approximately 200° C. and 320° C. with a precision of approximately +/−2° C. during the torrefaction process.

12. The system of claim 8, wherein an inner wall of the furnace tube comprises low-rise spiral baffles, configured to facilitate forward movement of the biomass material in the furnace tube when the furnace tube is rotated.

13. The system of claim 8, wherein the rotary furnace further comprises a coarse screen disposed near the tube exit, the coarse screen configured to allow torrefied biomass material to pass through the coarse screen and exit the rotary furnace while retaining the heat transfer elements within the furnace tube.

14. A method for torrefaction and particle size reduction of biomass material, the method comprising:
introducing the biomass material into a rotary furnace, the rotary furnace charged with a plurality of heat transfer elements, the heat transfer elements comprising rounded objects having a specific gravity at least 5 times a specific gravity of the biomass material, a heat capacity sufficient for the plurality of heat transfer elements to heat the biomass material, and a hardness sufficient for the heat transfer elements to serve as grinding media to reduce the particle size of the biomass material, the heat transfer elements further comprising surface features pre-formed thereon, the surface features being configured to increase traction between the heat transfer elements and the biomass material;
rotating the rotary furnace at a pre-defined rate to provide contact between the heat transfer elements and biomass material, to heat the biomass material and to use the heat transfer elements to grind the biomass material to reduce a particle size of the biomass material;
maintaining a predetermined temperature in the rotary furnace;
maintaining a low- or no-oxygen condition in the rotary furnace; and
discharging torrefied biomass material with a reduced particle size from the rotary furnace after a predetermined operating time.

15. The method of claim 14, wherein the heat capacity of the heat transfer elements is sufficient for the plurality of heat transfer elements having a total mass of approximately 8-10 times the mass of the biomass material being charged in the furnace to heat the biomass material.

16. The method of claim 14, wherein maintaining a predetermined temperature in the rotary furnace comprises maintaining a predetermined temperature in a range between approximately 200° C. and approximately 320° C., with a precision of +/−approximately 2° C.

17. The method claim 14, wherein maintaining a low- or no-oxygen condition in the rotary furnace comprises introducing an inert gas into the rotary furnace.

18. The method of claim 14, further comprising pre-heating the rotary furnace and the heat transfer elements within the rotary furnace to the predetermined temperature.

19. The method of claim 14, further comprising pre-drying the biomass material using a waste heat source prior to introducing the biomass material into the rotary furnace.

20. The method of claim 14 further comprising quenching the torrefied biomass material after it is discharged from the rotary furnace.

* * * * *